United States Patent Office 3,770,657
Patented Nov. 6, 1973

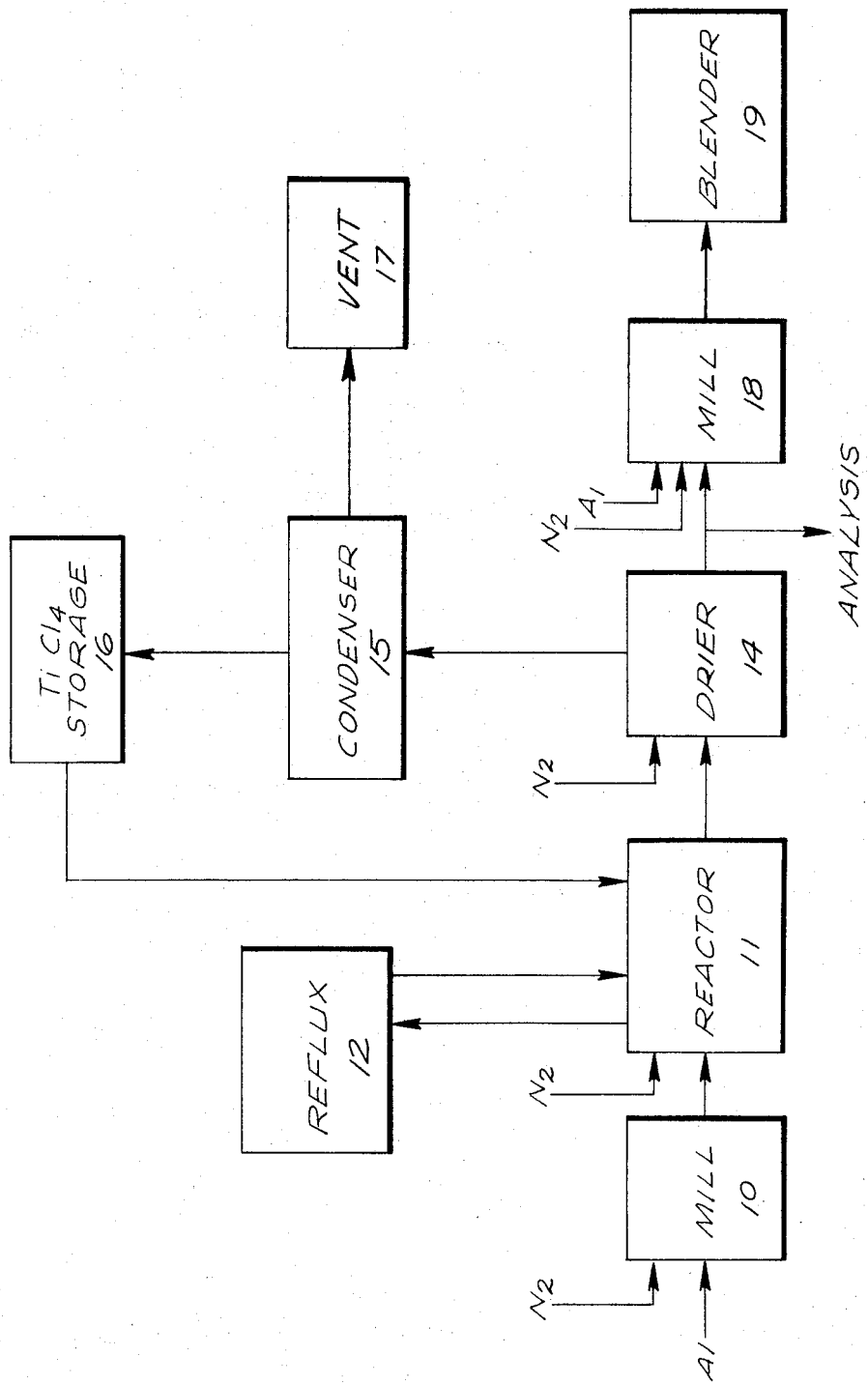

3,770,657
REMOVAL OF TITANIUM TETRACHLORIDE FROM TITANIUM TRICHLORIDE-ALUMINUM TRICHLORIDE
Arthur P. Haag, Moraga, and Meyer Weiner, Orinda, Calif., assignors to Dart Industries Inc., Los Angeles, Calif.
Filed Feb. 9, 1970, Ser. No. 9,614
Int. Cl. B01j *11/78*
U.S. Cl. 252—442         3 Claims

ABSTRACT OF THE DISCLOSURE

An improved process for producing co-crystals of titanium trichloride and aluminum trichloride with a composition of substantially three moles of titanium trichloride and one mole of aluminum trichloride or other desired ratio, and substantially free of impurities is described. Such crystals are of value as an active catalyst, particularly, for example, for preparing polypropylene. The improved process provided herein involves the removal of traces of titanium tetrachloride from already formed co-crystals by ball milling the co-crystals in the presence of a sufficient quantity of aluminum powder to substantially quantitatively react with titanium tetrachloride.

BACKGROUND

This invention is related to processes described and claimed in two copending U.S. patent applications concerning production of co-crystals of titanium trichloride and aluminum trichloride. The copending applications are Ser. No. 9,615, entitled "Process for Producing Activated Titanium Trichloride-Aluminum Trichloride," by Arthur P. Haag and Meyer Weiner, and Ser. No. 9,613, entitled "Process for Producing Titanium Trichloride-Aluminum Trichloride in Controlled Proportions," by Arthur P. Haag and Meyer Weiner. The teachings of these copending patent applications are hereby incorporated by reference for full force and effect as if set forth in full herein.

A combination of titanium trichloride and aluminum trichloride having a substantially stoichiometric quantity of these two compounds with three moles of titanium trichloride to each mole of aluminum trichloride has proven to be a valuable catalyst, particularly for the polymerization of polypropylene. Other ratios may also be desirable in some situations. It is believed that in order to be a high efficiency catalyst that co-crystals of the two materials are required, although it is not certain that the product is in fact a co-crystal and not some other combination of the two trichlorides. Mere mixtures of the two are not as effective so it is considered that a molecular combination is formed. The material that has a high catalyst efficiency is a purple powder, and the only known reliable measure of the material's quality is a determination of the abiltiy of the catalyst to promote a high yield of high quality polymer. It is known that some techniques for manufacturing the combination produce an amorphous brown powder which does not have high catalyst efficiency.

In order to evaluate the catalyst produced in any given manufacturing process, tests of the catalyst efficiency, namely the quantity of polymer that can be made with a given quantity of catalyst, are made. Another measure of the quality of catalyst is the isotacticity of polypropylene made with the catalyst. Several such tests are known and employed for evaluating catalysts. Thus, for example, U.S. Pat. 3,241,913 sets forth examples of these tests which are suitable for evaluating catalysts. Other well known tests employed in the plastic industry may be employed if desired.

In some processes it has been found that in order to obtain a high yield of high quality polypropylene, it is desirable to have crystals near the stoichiometric proportion of three moles of titanium trichloride per mole of aluminum trichloride. It is also found to be highly desirable that the combined crystals be substantially free of titanium tetrachloride, aluminum metal and iron. Such a catalyst has a high efficiency and produces a high degree of isotacticity in the polymer. When small quantities of catalyst are made under laboratory conditions, the properties of the material are readily controlled so that high quality catalysts can be produced. In a large-scale production process on the other hand, production control requires greater care and economies must be effected wherever possible in order to minimize the costs of the product without sacrificing quality.

The broad process for production of co-crystals of titanium trichloride and aluminum trichloride is well known and involves the reaction.

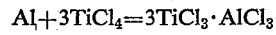

$$Al + 3TiCl_4 = 3TiCl_3 \cdot AlCl_3$$

which is normally conducted in an excess of titanium tetrachloride so that the reaction progresses rapidly in a slurry. After the reaction is completed, the product is dried to remove excess titanium tetrachloride which would contaminate the final product. A conventional technique for removing titanium tetrachloride involves heating the catalyst at a temperature above the boiling point of the titanium tetrachloride so that this relatively volatile material is vaporized. It is found, however, that aluminum trichloride also has a substantial volatility and heating for a sufficient time and at a temperature to remove substantially all of the titanium tetrachloride may volatilize a substantial amount of aluminum trichloride, thereby upsetting the desired ratio of materials in the co-crystals. It is, therefore, desirable, to employ a process for removing substantially all of the titanium tetrachloride and still maintain a desired composition of the catalyst. Such a process should also be economical and not otherwise diminish the catalyst efficiency or diminish the degree of isotacticity obtainable in a polymer made with the catalyst.

SUMMARY OF THE INVENTION

Thus, in the practice of this invention according to a preferred embodiment there is provided an improved process for making a desired composition of titanium trichloride and aluminum trichloride substantially free of excess titanium tetrachloride, including the step of reacting excess titanium tetrachloride with aluminum powder preferably in a ball mill or the like.

DRAWING

Objects and many of the attendant advantages of this invention will be appreciated as the same becomes better understood by reference to the following detailed description when considered in connection with the accompanying drawing which comprises a block diagram of a process for making co-crystals of titanium trichloride and aluminum trichloride according to principles of this invention.

DESCRIPTION

As mentioned hereinabove, an important process for production of co-crystals of titanium trichloride and aluminum trichloride involves reduction of titanium tetrachloride by aluminum metal. The drawing in this application illustrates in block form a batch process of this nature. In this block diagram only the principal operative elements are portrayed and it will be apparent to one skilled in the art that many collateral elements such as pumps, transfer devices, valves, controlling and metering devices, and the like are omitted from the diagram since they are conventional and not of such a nature as would affect practice of this invention.

As illustrated in this preferred embodiment, there is provided an initial ball mill 10 which is a conventional steel mill charged with steel balls and operable at room temperature in a conventional manner. Powdered aluminum metal is placed in the mill preferably with a grinding aid such as aluminum trichloride or titanium trichloride which serves to prevent caking of the aluminum and may also contribute to the process as described in the aforementioned copending patent applications. The ball mill 10 is preferably closed and the charge in the mill blanketed with an inert gas such as nitrogen or the like. The aluminum powder and other materials in the ball mill are ground for about one day in order to disrupt oxide coatings on the aluminum and thereby activate the aluminum powder for more rapid reaction with titanium tetrachloride.

After milling in the ball mill 10 for about one day, the aluminum metal is transferred to a reactor 11 which contains titanium tetrachloride at a temperature of less than about 90° C., so that the exothermic reaction does not overheat the reactor. Some aluminum trichloride may also be added to the reactor 11 for initiating reaction between the aluminum and the titanium tetrachloride. The reactor is, for example, an upright cylindrical vessel capable of containing about 500 gallons of titanium tetrachloride and may merely be a steel vessel although it is preferred that the reactor be glass lined for minimizing possibilities of corrosion and pickup of iron in the final product. The reactor 11 is a closed vessel charged with inert gas such as nitrogen or the like to prevent hydrolysis and oxidation of the reactive materials therein. The reactor is maintained at a temperature between about 136° and 200° C. and preferably in the range of about 160° to 180° C. The pressure in the reactor is maintained at about 20 p.s.i.g. to control boiling of the titanium tetrachloride which at atmospheric pressure has a boiling point of about 136° C. The reactor is preferably stirred to maintain the slurry well mixed throughout the reaction period.

The mixture of titanium tetrachloride and aluminum is maintained in the reactor 11 at an gentle boil for approximately one day which is found to be sufficient for substantially complete reaction between the titanium tetrachloride and the aluminum powder. A reflux condenser 12 is employed with the reactor in the conventional manner for returning vaporized titanium tetrachloride to the slurry in the reactor. Throughout the reaction in the reactor an excess of titanium tetrachloride is maintained. It should be noted that the mixture in the reactor remains a slurry as the aluminum powder is consumed since the titanium trichloride-aluminum trichloride co-crystals formed by the reaction are a finely divided purple solid at these temperatures, and the thickness of the slurry actually increases as the aluminum is consumed to form the catalyst.

When the reaction is effectively completed and the aluminum powder consumed, the mixture of titanium tetrachloride and co-crystals of titanium trichloride and aluminum trichloride is transferred to a drier 14 which is merely a closed steel vessel heated to a temperature in the range of from about 150° to 190° C., which is above the boiling point of titanium tetrachloride. If desired, an inert sweep gas such as nitrogen may be employed in the drier for carrying vaporized titanium tetrachloride therefrom. The titanium tetrachloride vapor produced in the drier 14 is carried to a condenser 15 where it is reliquified and returned to a titanium tetrachloride storage vessel 16 for return to the reactor 11 as required. Excess nitrogen is released by way of a vent 17.

The mixture of catalyst and titanium tetrachloride is maintained in the drier for several hours which is found sufficient to remove titanium tetrachloride from the catalyst down to less than about 5% by weight. Quite often the quantity of titanium tetrachloride remaining is substantially lower than 5% by weight in the order of about 1%. Some aluminum chloride is lost due to volatilizing with the titanium tetrachloride. If the heating is conducted at a higher temperature or for a substantially greater period of time in order to remove the last traces of titanium tetrachloride, it is found that additional aluminum trichloride is also volatilized from the co-crystals thereby changing the composition of the catalyst.

The catalyst is, therefore, removed from the drier 14 with at least traces of titanium tetrachloride remaining and up to about 5% of remaining titanium tetrachloride. This material is then transferred to a conventional ball mill 18 which is sealed and charged with an inert gas such as nitrogen, for example. A sample of material from the drier is obtained and the titanium tetrachloride content determined analytically by conventional techniques, such as, for example, a colorimetric technique. A quantity of aluminum powder sufficient to combine with the excess titanium tetrachloride according to the reaction.

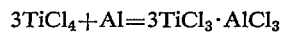

$$3TiCl_4 + Al = 3TiCl_3 \cdot AlCl_3$$

is also placed in the ball mill 18 with the catalyst.

The ball mill 18 is operated with supplemental cooling on the exterior such as low temperature water or a refrigerant so that the catalyst is not overheated during the ball milling operation. The mill is operated in this condition for a period of several days to enhance the catalyst efficiency and also to completely react the excess titanium tetrachloride with the aluminum powder, thereby removing this contaminant from the catalyst.

After ball milling the catalyst for activation and removal of titanium tetrachloride, several batches of the material may be combined and mixed in a blender 19 for achieving greater product uniformity.

It is preferred that the excess of titanium tetrachloride remaining in the co-crystals of titanium trichloride and aluminum trichloride be less than about 5% by weight of the mixture charged into the ball mill 18 so that a stoichiometric reaction with aluminum powder to produce activated co-crystals of titanium trichloride and aluminum trichloride is achieved without an excessive time of ball milling being required. If a higher quantity of titanium tetrachloride is present in the material from the drier it can be removed by low temperature milling with aluminum powder in the presence of the co-crystals, however, an economically impractical period of time in the final ball mill is required.

The converse effect is also of interest when there is an excess of aluminum in the reacted co-crystals. In that case a sufficient quantity of titanium tetrachloride to react with the excess aluminum to form the desired composition in the final co-crystals is added in the ball mill and reacted in the same manner. It will be seen that by such a technique the exact composition of titanium trichloride-aluminum trichloride co-crystals can be adjusted to any desired value although it is particularly preferred to adjust to a 3:1 ratio of titanium trichloride to aluminum trichloride.

In one example of catalyst production by a process incorporating the principles of this invention, co-crystals of titanium trichloride and aluminum trichloride were made in a reactor in the conventional manner and dried in a dier for about 24 hours at temperatures in the range of from about 160 to 180° C. Nitrogen gas was passed through the charge in the drier during this period to assist in the removal of titanium tetrachloride vapor. At the end of this period about 350 pounds of co-crystals of titanium trichloride and aluminum trichloride were transferred from the drier to a steel ball mill charged with steel balls. Colorimetric analysis of a sample of the co-crystals indicated the presence of about 2% by weight of titanium tetrachloride in the otherwise apparently dry powder. In order to remove this excess titanium tetrachloride about 0.33 pounds of aluminum powder was also added to the ball mill. The exterior of the ball mill was water cooled and the mill operated for a period of 60 hours. Analysis of the product taken from the mill after such grinding showed a titanium tetrachloride content of only about 0.1%, and a free aluminum content of only about 0.05%, indicating that substantially complete reaction had occurred between the titanium tetrachloride and the aluminum powder.

Although only one example has been set forth herein of a process incorporating principles of this invention, it will be apparent to one skilled in the art that many modifications and variations can be made in practice of this invention. Thus, for example, the grinding to produce complete reaction can be conducted in hammer mills, rod mills, pebble mills, vibratory grinders and the like. Many other modifications and variations will be apparent and it is therefore to be understood that within the scope of the appended claims the invention may be practiced otherwise than as specifically described.

What is claimed is:

1. A process for producing a purified co-crystallized titanium trichloride and aluminum trichloride catalyst substantially free of titanium tetrachloride comprising the steps of:
   forming a co-crystallized titanium trichloride and aluminum trichloride catalyst in an excess of titanium tetrachloride;
   drying the catalyst to remove excess titanium tetrachloride to a residual amount less than 5% by weight of titanium tetrachloride;
   transferring the dried catalyst containing a residual amount of titanium tetrachloride to a ball mill and adding a quantity of finely divided aluminum equal to the proportion of about 3 moles of titanium tetrachloride to 1 mole of aluminum; and
   grinding the resultant mixture in the absence of organic diluents to substantially complete reaction between the residual titanium tetrachloride and additional aluminum.

2. A process as defined in claim 1 wherein the grinding is conducted at substantially ambient temperature.

3. A process for producing a purified co-crystallized titanium trichloride and aluminum trichloride catalyst substantially free of titanium tetrachloride and aluminum comprising the steps of:
   reacting finely divided aluminum with an excess of titanium tetrachloride at temperatures in the range of about 136° C. to 200° C. under reflux conditions to form a slurry of co-crystallized titanium trichloride and aluminum trichloride catalyst having a molar ratio of 3 moles of titanium trichloride per 1 mole of aluminum trichloride in excess of titanium tetrachloride;
   drying the slurry of catalyst and excess titanium tetrachloride at temperatures in the range of 150° C. to 190° C. to reduce the excess titanium tetrachloride to a residual amount of less than 5% by weight;
   transferring the dried catalyst containing a residual amount of titanium tetrachloride to a ball mill and adding a quantity of finely divided aluminum equal to the proportion of about 3 moles of titanium tetrachloride to 1 mole of aluminum; and
   ball milling the resulting mixture in the absence of organic diluents to substantially complete reaction between the residual titanium tetrachloride and additional aluminum.

References Cited

UNITED STATES PATENTS

| | | | |
|---|---|---|---|
| 3,010,787 | 11/1961 | Tornquist | 252—429 C |
| 3,032,510 | 5/1962 | Tornquist et al. | 252—429 A |
| 3,109,822 | 11/1963 | Kaufman et al. | 252—429 C |
| 3,172,865 | 3/1965 | Fennell | 252—429 C X |
| 3,275,568 | 9/1966 | Stanley et al. | 252—442 |
| 3,461,083 | 8/1969 | Luciani et al. | 252—429 A |
| 3,001,951 | 9/1961 | Tornquist et al. | 252—429 C |
| 3,121,063 | 2/1964 | Tornquist | 252—429 C |

PATRICK P. GARVIN, Primary Examiner

U.S. Cl. X.R.

252—429 C